United States Patent Office 2,918,456
Patented Dec. 22, 1959

2,918,456

HALOGENATED BUTYL AND DIHYDRO-
CARBONTIN SULFIDES

Leon S. Minckler, Jr., Metuchen, Delmer L. Cottle, Highland Park, and Theodore Lemiszka, Rahway, N.J., assignors to Esso Research and Engineering Company, a corporation of Delaware No Drawing. Application February 20, 1958
Serial No. 716,270

19 Claims. (Cl. 260—79.5)

This invention relates to rubbery polymeric compositions which are halogenated copolymers of isoolefins and multiolefins and to the preparation and vulcanization of such compositions and more particularly to improved methods for curing halogenated butyl rubber with minor proportions of certain polyalkyl and polyaryl tin sulfides.

Copolymers of the above general type, especially where the copolymer contains about 85 to 99.5% (preferably about 95 to 99.5%) of a $C_4$ to $C_7$ isoolefin such as isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government Rubber-Isobutylene) and, for example, is referred to as "butyl rubber" in the textbook "Synthetic Rubber" by G. S. Whitby. The preparation of butyl type rubber is described in U.S. Patent 2,356,128 to Thomas et al. as well as in technical literature. In general, the multiolefinic component of the rubber comprises a conjugated diolefin such as isoprene, butadiene, dimethyl butadiene, piperylene, etc. The reaction product of isobutylene and isoprene is preferred. Butyl rubber has a mole percent unsaturation of between about 0.5 to 15.0.

Halogenated butyl-type rubbery copolymers, which may be vulcanized with zinc oxide and are covulcanizable with more highly unsaturated rubbers, are produced by halogenating the butyl rubber in a manner which does not degrade the molecular weight thereof, but halogenated sufficiently to produce a rubbery product which, when vulcanized, retains its tensile strength upon heat aging. Such halogenated butyl rubbers are readily covulcanizable with more highly unsaturated rubbers with or without added sulfur to produce rubbery products of excellent heat aging resistance. The halogenated butyl rubbers so formed also do not greatly differ in curing rate as compared to natural rubber and synthetic rubbers such as GR-S rubber.

It has now been discovered that halogenated butyl rubber may be cured to produce vulcanizates exhibiting improvements in stress-strain properties such as improved tensile strength and extension modulus, as well as improved hysteresis and dynamic properties by vulcanizing the halogenated butyl rubber in the absence of other curatives such as metallic oxides and sulfur with either di-$C_1$ to $C_{18}$ alkyl tin sulfides and/or di-$C_6$ to $C_{18}$ aryl tin sulfides.

In practicing the present invention, 100 parts by weight of halogenated butyl rubber are compounded in the absence of added sulfur and metallic oxides with about 20 to 100 parts by weight of a filler such as clays or carbon blacks, and about 0.5 to 20.0, advantageously about 1.0 and 10.0, and preferably about 2 to 6 parts by weight of a di-alkyl and/or di-aryl tin sulfide with the optional addition of such conventional compounding agents as antioxidants such as p-amino beta-naphthylamine, antitack agents such as stearic acid, resins, plasticizers, etc. The resulting compounded stock is then cured by heating the same for about 1 minute to 5 hours, advantageously for about 5 minutes to 3 hours and preferably for about 15 minutes to 2 hours at a temperature level of between about 200° to 400° F. and preferably at about 275° to 375° F. to produce a vulcanizate having a combination of excellent tensile strength and extension modulus as well as low permanent set and low loss of energy as shown by a low absolute damping (i.e., internal viscosity times frequency of oscillation).

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined chlorine or 3 "X" weight percent combined bromine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or 3 atoms of bromine combined in the polymer per molecule of multiolefin present therein: i.e., not more than about one atom of combined chlorine or three atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tri-bromophenol bromdie, N-chloroacetamide, beta-bromo-methyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the Butyl rubber in the solvent will depend upon the type of reactor, molecular weight of the Butyl rubber, etc. In general, the concentration of a Butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated Butyl rubber polymer may be recovered in various manners. The polymer may be precipitated with acetone or any other known non-solvent for the Butyl rubber and dried under about 1 to 760 millimeters or higher of mercury pressure absolute at about 0° to 180° C., preferably at about 50° to 150° C. (e.g. 70° C.). Other methods of recovering the halogenated Butyl rubber polymer from the hydrocarbon solution of the same are by conventional spray or drum drying techniques. Alternatively, the halogenated Butyl rubber-containing solution may be injected into a vessel containing agitated water heated to a temperature sufficient to flash off the hydrocarbon solvent and form an aqueous slurry of the halogenated Butyl rubber. The halogenated Butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

HALOGENATED BUTYL RUBBERS "B" TO "L"

Other examples of halogenated isoolefin-multiolefin copolymers which can be used are tabulated hereinafter, the amount of isoolefin and multiolefin in copolymer, halogenation agent, and amount of halogen combined in the copolymer being as follows:

mole percent unsaturation of 1.6. The chlorination of a solution of the uncured Butyl rubber was conducted in a 500-gallon glass-lined Pfaudler reactor equipped with an agitator, baffle, submersed stainless steel sparger ring and a conduit leading into the ring.

Gaseous chlorine was continuously added to the Butyl rubber solution over a period of ½ hour at a temperature level of 30° C. and under atmospheric pressure. The chlorine was added to the reactor through the conduit via the sparger ring. The chlorination was then terminated and the solution containing the chlorinated Butyl rubber formed was agitated for an additional 20 minutes. The resulting solution of chlorinated Butyl rubber was then water washed three times to remove dissolved hydrogen chloride.

The absolute amount of Butyl rubber, benzene solvent and gaseous chlorine added, as well as the calculated percent of added chlorine based on polymer and resulting percent of chlorine combined in the polymer were as follows:

|  | Pounds | Composition of chlorinated product, percent |
|---|---|---|
| Butyl rubber | 170 | 98.65 |
| Benzene solvent | 1,540 | |
| Chlorine | 4.8 (i.e. 2.8%) | 1.35 |

The resulting water-washed solution containing the stabilized, chlorinated Butyl rubber "M" was then recovered by injecting the solution into an agitated aqueous slurry containing zinc stearate and a small amount of a nonionic wetting agent of the aliphatic polyoxyethylene ether type (e.g., Sterox AJ or Tergitol NPX) in an amount of 0.7 pound of the zinc stearate per 100 pounds of chlorinated Butyl rubber as a dispersing aid. The agitated solution was maintained at a temperature between about 190° and 210° F. (e.g., 200° F.) whereby to flash off the benzene solvent and form an aqueous slurry of the chlorinated Butyl rubber in water. This slurry was then filtered and the chlorinated Butyl rubber, which was in the form of a wet "crumb," was placed in a Proctor and Schwartz tray drier maintained at 180° F. (i.e. 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

Example I 100 parts by weight of a chlorinated butyl rubber having a Mooney viscosity (212° F. for 8 minutes) of 65,

| Halogenated Rubber | Isoolefin (Percent) [1] | Multiolefin (Percent) [1] | Halogenation Agent | (Percent) Halogen in the Rubber [1] |
|---|---|---|---|---|
| B | Isobutylene (98) | Isoprene (2) | SO$_2$Cl$_2$ | 1.2 chlorine. |
| C | Isobutylene (95) | Isoprene (5.0) | Cl$_2$ in CCl$_4$ | 2.5 chlorine. |
| D | Isobutylene (94) | Cyclopentadiene (6) | Cl$_2$ in CCl$_4$ | 2.0 chlorine. |
| E | Isobutylene (92) | Myrcene (8.0) | Cl$_2$ in CCl$_4$ | 1.6 chlorine. |
| F | 2-methyl-butene-1 (95) | Isoprene (5) | Cl$_2$ in Hexane | 1.5 chlorine. |
| G | 3-methyl-butene-1 (96) | Butadiene (4) | Cl$_2$ in Hexane | 1.9 chlorine. |
| H | Isobutylene (98) | 1-vinyl cyclohexene-3 (2) | Cl$_2$ in CCl$_4$ | 0.8 chlorine. |
| I | Isobutylene (92) | Butadiene (8) | gaseous chlorine | 2.8 chlorine. |
| J | Isobutylene (85) | Isoprene (15) | gaseous chlorine | 6.6 chlorine. |
| K | Isobutylene (98) | Isoprene (2) | N,N'-dichloro-5,5-dimethyl hydantoin | 1.1 chlorine. |
| L | Isobutylene (98) | Isoprene (2) | liquid bromine | 2.3 bromine. |

[1] Note: (Percent) in all instances is percent by weight.

CHLORINATED BUTYL RUBBER "M"

An additional run was made chlorinating a commercial Butyl rubber dissolved in benzene. The butyl rubber had a Mooney viscosity at 212° F. for 8 minutes of 75, and a a mole percent unsaturation of 1.3, a viscosity average molecular weight of 475,000 and a combined chlorine content of 1.1 weight percent were compounded with 50 parts by weight of HAF carbon black, 1.0 part by weight of stearic acid and 5.0 parts by weight of either zinc oxide or dibutyltin sulfide and cured for 30 minutes at 307° F. with the following results:

|  | Zinc oxide cure | Dibutyltin sulfide cure |
|---|---|---|
| Modulus at 300% elong. (p.s.i.) | 1,300 | 1,740 |
| Tensile strength (p.s.i.) | 2,000 | 3,255 |
| Elongation (percent) | 400 | 445 |

The above data show that dibutyltin sulfide cures chlorinated butyl rubber into a vulcanizate having a higher tensile strength and modulus than does zinc oxide.

*Example II*

The same general procedure as in Example I was repeated except that the cure was for 60 minutes. The stress-strain data was similar, the Goodrich Flexometer and Yerzley Oscillograph data being as follows:

|  | Zinc oxide cure | Dibutyltin sulfide cure |
|---|---|---|
| Goodrich Flexometer Data: |  |  |
| Permanent set, percent | 7.6 | 2.9 |
| Maximum temperature rise, °C | 37 | 15 |
| Yerzley Oscillograph Data: Absolute damping × 10⁻⁶ (poises × c.p.s.) | 2.49 | 1.80 |

The above data show that chlorinated butyl rubber, when cured by dibutyltin sulfide exhibits a lower permanent set, less temperature rise during flexing and better (i.e., lower) absolute damping than when cured by zinc oxide.

*Example III*

The same general procedure as in Example I was repeated except that only 3.0 parts by weight of the dibutyltin sulfide was used and the halogenated butyl rubber was a brominated butyl rubber having a Mooney viscosity (212° F. for 8 minutes) of 66, a mole percent unsaturation of 0.7, a viscosity average molecular weight of 476,000, and a combined bromine content of 2.15 weight percent. All cures were at 307° F. for 60 minutes with the following results:

|  | Zinc oxide cure | Dibutyltin sulfide cure |
|---|---|---|
| Modulus at 300% elong. (p.s.i.) | 1,925 | 2,465 |
| Tensile strength (p.s.i.) | 2,470 | 2,765 |
| Elongation (percent) | 330 | 320 |
| Permanent set (percent) | 3.6 | 1.9 |
| Maximum temperature rise, °C | 32 | 17 |
| Absolute damping × 10⁻⁶ (poises × c.p.s.) | 2.60 | 1.53 |

The above data show that the brominated butyl rubber cured by dibutyltin sulfide exhibited better modulus, higher tensile strength, better hysteresis (i.e., less compression set and less temperature rise during flexing), and better dynamic properties (i.e., less loss of energy as exhibited by the lower absolute damping) compared to zinc oxide cured brominated butyl rubber vulcanizates.

*Example IV*

The same general procedure as in Example I was repeated using other $C_1$ to $C_{18}$ dialkyl and diaryltin sulfides.

| Curing agent | Parts by weight | | | |
|---|---|---|---|---|
| Dimethyltin sulfide | 5.0 |  |  |  |
| Dioctyltin sulfide |  | 5.0 |  |  |
| Dilauryltin sulfide |  |  | 5.0 |  |
| Diphenyltin sulfide |  |  |  | 5.0 |
| Cured 30′ at 307° F.: |  |  |  |  |
| Modulus at 300% elong. (p.s.i.) | 2,350 | 1,950 | 1,730 | 2,300 |
| Tensile strength (p.s.i.) | 3,115 | 2,955 | 2,950 | 2,660 |
| Elongation (percent) | 405 | 440 | 490 | 335 |
| Goodrich Flexometer 60′ at 307° F.: |  |  |  |  |
| Maximum temperature rise (° C.) | 21 | 23 | 22 |  |
| Yerzley Oscillograph 60′ at 307° F.: |  |  |  |  |
| Absolute damping ×10⁻⁶ (poises × c.p.s.) | 1.89 | 1.57 | 1.96 |  |

The above data show that chlorinated butyl rubber cured by dialkyl and diaryltin sulfides results in better vulcanizates as to tensile strength, hysteresis and damping compared to the zinc oxide control cure as in Examples I and II.

Resort may be had to modifications and variations of the disclosed embodiments without departing from the spirit of the invention or the scope of the appended claims.

What is claimed is:

1. A composition comprising a rubbery halogenated copolymer of about 85 to 99.5 weight percent of a $C_4$ to $C_7$ isoolefin and about 15 to 0.5 weight percent of a $C_4$ to $C_{14}$ multiolefin and about 0.5 to 20.0 weight percent of a dihydrocarbon tin sulfide containing 1 to 18 carbon atoms, said composition being free of added zinc oxide.

2. A composition according to claim 1 in which the halogenated copolymer is selected from the group consisting of those containing at least 0.5 weight percent chlorine but not more than about one atom of chlorine per double bond in the copolymer, those containing at least abut 0.5 weight percent bromine but not more than about three combined atoms of bromine per double bond in the copolymer, and mixtures thereof.

3. A composition according to claim 1 in which the tin sulfide is present in an amount of between about 1.0 and 10.0 weight percent based on halogenated copolymer.

4. A composition according to claim 1 in which the dihydrocarbon tin sulfide is selected from the group consisting of di-$C_1$ to $C_{18}$ alkyltin sulfides, di-$C_6$ to $C_{18}$ aryltin sulfides, and mixtures thereof.

5. A composition according to claim 1 in which the dihydrocarbon tin sulfide is dimethyltin sulfide.

6. A composition according to claim 1 in which the dihydrocarbon tin sulfide is dibutyltin sulfide.

7. A composition according to claim 1 in which the dihydrocarbon tin sulfide is dioctyltin sulfide.

8. A composition according to claim 1 in which the dihydrocarbon tin sulfide is dilauryltin sulfide.

9. A composition according to claim 1 in which the dihydrocarbon tin sulfide is diphenyltin sulfide.

10. A composition according to claim 1 which has been vulcanized by heating the same for between about 1 minute and 5 hours at a temperature level of between about 200° and 400° F. to produce a vulcanizate having a high tensile strength, low permanent set and low absolute damping.

11. A composition comprising a rubbery polymer having a viscosity average molecular weight of at least about 100,000 comprising atoms of hydrogen, carbon and a halogen selected from the group consisting of bromine, chlorine, iodine and mixtures thereof, containing in its structure a major proportion of hydrocarbon units derived by the polymerization of isoolefins containing about 4 to 7 carbon atoms and also containing sufficient amounts of a $C_4$ to $C_{14}$ multiolefin that the mole percent unsaturation of the polymer is between about 0.5 and 15; said polymer containing at least about 0.5 weight percent halogen but not more than about one combined atom of halogen per double bond in the polymer; said polymer being in composition with about 0.5 to 20 weight percent of a dihydrocarbon tin sulfide selected from the group consisting of di-$C_1$ to $C_{18}$ alkyltin sulfides, di-$C_6$ to $C_{18}$ aryltin sulfides, and mixtures thereof, said composition being free of added zinc oxide and elemental sulfur.

12. A composition according to claim 11 in which the polymer contains chlorine.

13. A composition according to claim 11 in which the polymer contains bromine.

14. A composition according to claim 11 in which the tin sulfide is present in an amount of between about 2 and 6 weight percent based on the halogen-containing polymer.

15. A composition according to claim 11 in which the polymer is also in composition with about 20 to 100 parts by weight of a filler per 100 parts by weight of polymer.

16. A composition according to claim 11 which has been vulcanized for between about 15 minutes and 2 hours at a temperature level of between about 275° and 375° F. to produce a vulcanizate having a high tensile strength, low temperature rise on flexing and low absolute damping.

17. A process which comprises vulcanizing halogenated butyl rubber in the absence of zinc oxide by about 0.5 to 20.0 weight percent of a dihydrocarbon tin sulfide selected from the group consisting of di-$C_1$ to $C_{18}$ alkyltin sulfides, di-$C_6$ to $C_{18}$ aryltin sulfides, and mixtures thereof at a temperature level of between about 200° and 400° F. until the resulting vulcanizate exhibits a tensile strength of at least about 2500 p.s.i.

18. A process according to claim 17 in which the halogenated butyl rubber contains chlorine.

19. A process according to claim 17 in which the halogenated butyl rubber contains bromine.

References Cited in the file of this patent

UNITED STATES PATENTS

| | | |
|---|---|---|
| 2,732,354 | Morrissey et al. | Jan. 24, 1956 |
| 2,789,103 | Weinberg et al. | Apr. 16, 1957 |
| 2,809,372 | Frederick et al. | Oct. 8, 1957 |
| 2,832,753 | Weinberg et al. | Apr. 29, 1958 |